United States Patent
Kobuse

(10) Patent No.: US 9,721,609 B2
(45) Date of Patent: Aug. 1, 2017

(54) IMAGE CAPTURING APPARATUS, IMAGE CAPTURING SYSTEM, AND CONTROL METHOD FOR THE IMAGE CAPTURING APPARATUS

(71) Applicant: CANON KABUSHIKI KAISHA, Tokyo (JP)

(72) Inventor: Takenori Kobuse, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 14/483,429

(22) Filed: Sep. 11, 2014

(65) Prior Publication Data
US 2015/0078725 A1 Mar. 19, 2015

(30) Foreign Application Priority Data
Sep. 18, 2013 (JP) ................................ 2013-193490

(51) Int. Cl.
| | |
|---|---|
| H04N 5/335 | (2011.01) |
| G11B 20/00 | (2006.01) |
| G11B 20/22 | (2006.01) |
| G11B 20/24 | (2006.01) |
| H04N 5/365 | (2011.01) |
| H04N 5/77 | (2006.01) |

(Continued)

(52) U.S. Cl.
CPC ........ *G11B 20/00007* (2013.01); *G11B 20/22* (2013.01); *G11B 20/24* (2013.01); *H04N 5/365* (2013.01); *H04N 5/3655* (2013.01); *H04N 5/772* (2013.01); *H04N 5/911* (2013.01); *G11B 2020/00072* (2013.01)

(58) Field of Classification Search
USPC ........................ 348/241, 222.1, 308; 386/224
See application file for complete search history.

(56) References Cited

U.S. PATENT DOCUMENTS

| | | | |
|---|---|---|---|
| 6,614,473 B1 * | 9/2003 | Kijima | H04N 5/361 348/241 |
| 2006/0044424 A1 | 3/2006 | Shirai et al. | |

(Continued)

FOREIGN PATENT DOCUMENTS

| | | |
|---|---|---|
| CN | 1761309 A | 4/2006 |
| CN | 1783957 A | 6/2006 |

(Continued)

OTHER PUBLICATIONS

Machine Translation of JP 2010-200109, "Imaging Device, Control Method, and Program", Ueda Toshiharu, Sep. 9, 2010.*

(Continued)

*Primary Examiner* — Daquan Zhao
(74) *Attorney, Agent, or Firm* — Cowan, Liebowitz & Latman, P.C.

(57) ABSTRACT

An image capturing apparatus comprises an image capturing unit that includes an image sensor that has an effective pixel region and a reference pixel region which outputs a reference signal for correcting an output signal of the effective pixel region. In a case where a predetermined condition is satisfied, a reduction unit reduces a data amount of reference pixel region data that corresponds to the reference pixel region in an image data obtained by the image capturing unit. A recording unit records the image data after the processing performed by the reduction unit.

13 Claims, 5 Drawing Sheets

(51) Int. Cl.
*H04N 5/911* (2006.01)
*H01L 27/146* (2006.01)

(56) References Cited

U.S. PATENT DOCUMENTS

2006/0078055 A1    4/2006  Kanazawa
2011/0007185 A1*   1/2011  Yonaha ................ H04N 5/2353
                                                          348/239

FOREIGN PATENT DOCUMENTS

| CN | 101268682 A | 9/2008 | | |
|---|---|---|---|---|
| CN | 101841666 A | 9/2010 | | |
| CN | 102547087 A | 7/2012 | | |
| CN | 102843526 A | 12/2012 | | |
| EP | 1662774 A2 | 5/2006 | | |
| JP | 2005-175930 A | 6/2005 | | |
| JP | 2007-300282 A | 11/2007 | | |
| JP | 2008-288816 A | 11/2008 | | |
| JP | 2009-017459 A | 1/2009 | | |
| JP | 2010-200109 | * | 9/2010 | ............. H04N 5/335 |

OTHER PUBLICATIONS

The above patent documents were cited in a Mar. 3, 2017 Chinese Office Action, which is enclosed with an English Translation, that issued in Chinese Patent Application No. 201410471892.3.
The above foreign patent document was cited in the Jun. 9, 2017 Japanese Office Action, a copy of which is enclosed without an English Translation, that issued in Japanese Patent Application No. 2013193490.

* cited by examiner

IMAGE CAPTURING APPARATUS, IMAGE CAPTURING SYSTEM, AND CONTROL METHOD FOR THE IMAGE CAPTURING APPARATUS

BACKGROUND OF THE INVENTION

Field of the Invention

The present invention relates to an image capturing apparatus, image capturing system, and a control method for the image capturing apparatus.

Description of the Related Art

The number of pixels that can be recorded in image capturing apparatuses such as digital video cameras has increased in recent years. This is closely related to the standards of monitors for displaying video recorded by image capturing apparatuses. Specifically, there has been a transition from the so-called SD (Standard Definition) standard to the so-called HD (High Definition) standard, and a transition to monitors having an even higher resolution is planned for the future.

The HD resolution is mainly 1920 pixels in the horizontal direction by 1080 pixels in the vertical direction (referred to hereinafter as 1920×1080 pixels), and the resolution of so-called 4K2K monitors thought to be the next generation is 3840×2160 pixels, which is four times the number of pixels in the HD standard. Also, the standard being developed for digital cinema is 4096×2160 pixels, which is higher than the number of pixels in the 4K2K standard. Also, the so-called 8K4K standard is thought to be the next generation after the 4K2K standard, and this standard has 7680×4320 pixels. With this standard, the number of pixels for digital cinema would be thought to be over 8K in the horizontal direction.

This change has been accompanied by a requirement for image capturing apparatuses to be able to record a higher number of pixels as well. For example, in order to be compatible with the number of recording pixels in the aforementioned super high-vision, lenses, image sensors, image processing LSIs for performing digital processing on video signals, video output LSIs for externally outputting video signals, and the like need to be compatible with a high number of pixels. The pixel count of image sensors also needs to be compatible with the number of pixels in super high-vision.

In recent years, there have been cases where CMOS image sensors used as image sensors in image capturing apparatuses have generated various types of noise due to their structure. Specific examples of such noise include FPN (Fixed-Pattern Noise) in the vertical direction, vertical line noise caused by sensitivity non-uniformity (PRNU), and noise caused by dark current non-uniformity (DSNU). Normally, FPN correction is performed in real-time in image processing LSIs in image capturing apparatuses and the like. FPN correction is performed using data acquired from an optical black (OB) pixel region of the image sensor.

However, since the amount of information per frame is large in a video signal that has a high pixel count, correcting it in real-time involves a high processing load. This leads to the problems of an increase in the scale of the image processing LSI and an increase in power consumption.

Japanese Patent Laid-Open No. 2007-300282 discloses a system in which image data from an image sensor is recorded as RAW data not subjected to image processing, and then image processing is performed at a later time. Using the technique in Japanese Patent Laid-Open No. 2007-300282, image data can be directly recorded as RAW data without being subjected to correction processing such as FPN correction in real-time, thus making it possible to reduce the processing load during image capturing. Development processing can be performed on the RAW data at a later time without placing a large burden on the image processing LSI.

However, when the technique in Japanese Patent Laid-Open No. 2007-300282 is used, correction processing that uses OB pixel region data, such as FPN correction, is performed at a later time, and therefore output images from the image sensor are recorded as RAW data that includes the OB pixel region as well. For this reason, the RAW data has a large size, and the amount of capacity consumed in the recording medium increases.

SUMMARY OF THE INVENTION

The present invention has been achieved in light of such circumstances, and provides a technique for, in the case where correction processing that uses OB pixel region data is performed after image data recording, reducing the amount of OB pixel region data that is recorded while also suppressing a reduction in quality in correction processing.

According to an aspect of the present invention, there is provided an image capturing apparatus comprising: an image capturing unit that includes an image sensor that has an effective pixel region and a reference pixel region which outputs a reference signal for correcting an output signal of the effective pixel region; a reduction unit configured to, in a case where a predetermined condition is satisfied, reduce a data amount of reference pixel region data that corresponds to the reference pixel region in an image data obtained by the image capturing unit; and a recording unit configured to record the image data after the processing performed by the reduction unit.

According to another aspect of the present invention, there is provided an image capturing system comprising: an image capturing unit that includes an image sensor that has an effective pixel region and a reference pixel region which outputs a reference signal for correcting an output signal of the effective pixel region; a reduction unit configured to, in a case where a predetermined condition is satisfied, reduce a data amount of reference pixel region data that corresponds to the reference pixel region in an image data obtained by the image capturing unit; a recording unit configured to record the image data after the processing performed by the reduction unit; and a control unit configured to control the image capturing unit, the reduction unit, and the recording unit.

According to yet another aspect of the present invention, there is provided a control method for an image capturing apparatus that comprises an image capturing unit that includes an image sensor that has an effective pixel region and a reference pixel region which outputs a reference signal for correcting an output signal of the effective pixel region, the control method comprising: a reduction step of, in a case where a predetermined condition is satisfied, reducing a data amount of reference pixel region data that corresponds to the reference pixel region in an image data obtained by the image capturing unit; and a recording step of recording the image data after the processing performed in the reduction step.

Further features of the present invention will become apparent from the following description of exemplary embodiments with reference to the attached drawings.

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

First Embodiment

Figure 1:
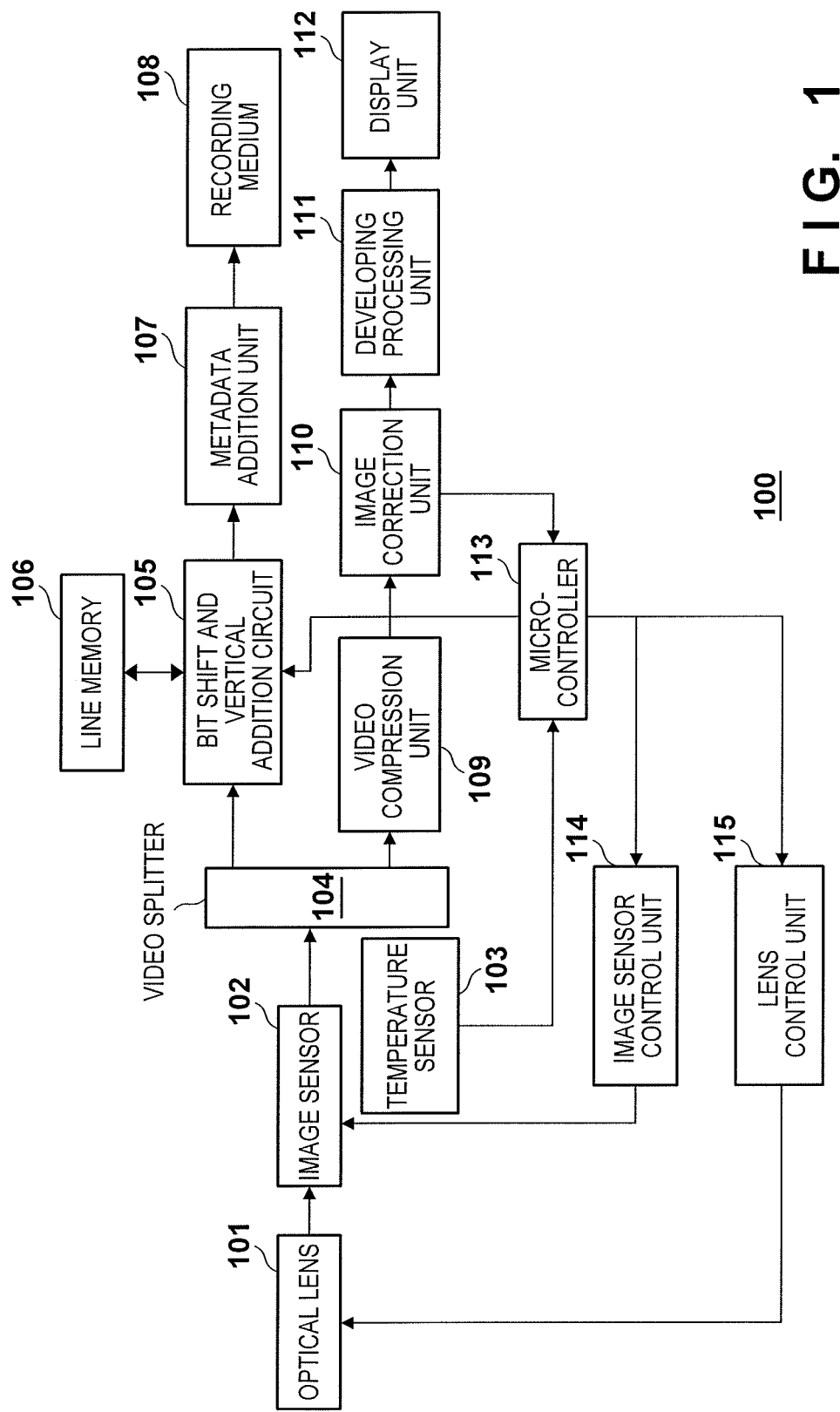
FIG. 1 is a diagram showing function blocks of an image capturing apparatus 100 according to a first embodiment.

FIG. 1 is a diagram showing function blocks of an image capturing apparatus 100 according to a first embodiment. In FIG. 1, an optical lens 101 picks up subject light. The optical lens 101 typically has a focus mechanism for focusing, a diaphragm mechanism for adjusting the light quantity and depth of field, and a zoom mechanism for changing the focal length. Note that if the lens is a single-focus lens, the zoom mechanism is not provided. Also, if the lens is a pan-focus lens, the focus is only on one point at infinity, and the focus mechanism is not provided. In order to reduce the cost of the lens, there are cases where the diaphragm position is set to one position, and an ND filter for adjusting the light quantity is used as a substitute. In the present embodiment, any optical lens may be used as the optical lens 101 as long as it transmits light to form an image on an image sensor 102.

The image sensor 102 receives incident light from the optical lens 101, converts it into an electrical signal, and outputs the electrical signal. Typical examples of the image sensor include a CCD (Charge Coupled Device) image sensor and a CMOS image sensor. An image sensor that directly outputs an analog video signal may be used as the image sensor 102. Alternatively, it is possible to use an image sensor that internally performs AD (Analog-Digital) conversion processing and outputs a video signal in a digital data format such as LVDS (Low Voltage Differential Signaling).

A temperature sensor 103 measures the temperature of the image sensor 102 and transmits the measured temperature to a microcontroller 113. A video splitter 104 splits the video signal from the image sensor 102 into multiple signals.

A bit shift and vertical addition circuit 105 reduces the number of pixels in a split video signal from the video splitter 104 by performing processing such as bit shifting, averaging, or thinning as necessary on particularly the optical black (OB) pixel region. Averaging is performed by vertically adding pixels using a line memory 106 that temporarily stores row data.

Information indicating the signal compression processing (processing for reducing the number of pixels) performed by the bit shift and vertical addition circuit 105 is attached to each frame as metadata by a metadata addition unit 107. This metadata is referenced when correction processing that uses OB pixel region data (e.g., fixed pattern noise (FPN) correction) is performed at a later time.

A recording medium 108 records a video signal that includes OB pixel region data as RAW data. The OB pixel region data that is recorded has been compressed by the bit shift and vertical addition circuit 105 as necessary.

A video compression unit 109 reduces the number of pixels in the frames of a split video signal from the video splitter 104 by performing processing for performing addition on the entire video signal, processing for thinning out a portion of the video signal, or the like. Here, video signal compression processing (processing for reducing the number of pixels) is performed so as to reduce the number of pixels to the extent to which it is possible for an image correction unit 110 (described below) to perform correction processing such as FPN correction in real-time.

The image correction unit 110 performs correction processing such as FPN correction in real-time on the compressed video signal (reduced image data) from the video compression unit 109. The image correction unit 110 calculates a signal evaluation value related to exposure, focus, image shake correction, or the like based on the corrected video signal, and transmits the evaluation value to the microcontroller 113.

A developing processing unit 111 has typical image processing functions in the image capturing apparatus 100, and performs various types of developing processing such as noise reduction, gamma correction, knee correction, digital gain processing, and flaw correction. The developing processing unit 111 includes a storage circuit for storing setting values that are necessary in the various types of correction and image processing.

A display unit 112 displays video resulting from the developing processing performed by the developing processing unit 111. The display unit 112 is typically a liquid crystal monitor, viewfinder, or the like attached to the image capturing apparatus 100. The user of the image capturing apparatus 100 can check the angle of view, exposure, and the like using the display unit 112.

The microcontroller 113 determines operations of the optical lens 101, the image sensor 102, and the like based on the signal evaluation value from the image correction unit 110, temperature information from the temperature sensor 103, and the like, and controls an image sensor control unit 114 and a lens control unit 115 based on the determined operations. The image sensor control unit 114 and the lens control unit 115 respectively control the image sensor 102 and the optical lens 101 based on instructions from the microcontroller 113.

Figure 2A:
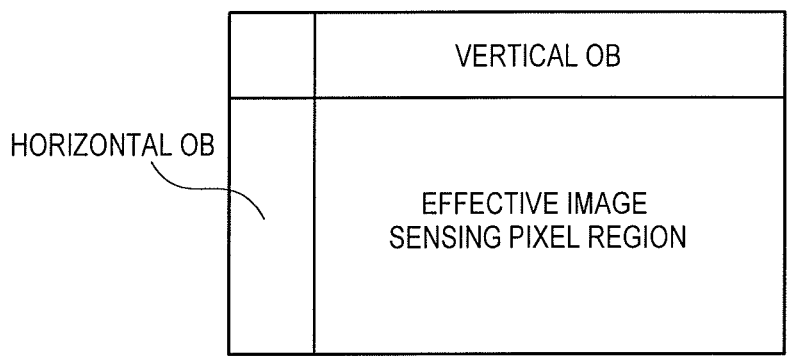
FIG. 2A is a diagram showing a general pixel configuration of an image sensor 102.

Next, operations performed by the bit shift and vertical addition circuit 105 will be described in detail with reference to FIGS. 2A to 2C and FIGS. 3A and 3B. FIG. 2A is a diagram showing the general pixel configuration of the image sensor 102. The pixels of the image sensor 102 include an effective image sensing pixel region that receives light from the lens and converts it into a video signal, and an optical black (OB) pixel region that blocks light from the lens and outputs the black level. In particular, the OB pixel region arranged above or below the effective image sensing pixel region is called the vertical OB pixel region, and the OB pixel region arranged to the left or the right of the effective image sensing pixel region is called the horizontal OB pixel region. These OB pixel regions are used mainly in horizontal OB clamping for adjusting the black level of the video signal, in image sensor FPN correction, and the like.

In the present embodiment, image data is recorded to the recording medium 108 without being subjected to horizontal OB clamping, image sensor FPN correction, or the like. For this reason, in order for recorded video to be appropriately processed and reproduced at a later time, data from the OB pixel region (OB pixel region data) also needs to be recorded in the recording medium 108 along with the RAW video, which is the unprocessed video signal from the effective image sensing pixel region (effective image sensing pixel region data). However, since the unprocessed RAW video has not been subjected to compression processing, the data amount per frame is very high. For this reason, the bit shift and vertical addition circuit 105 compresses the OB pixel region within the range of not having a large influence on horizontal OB clamping and image sensor FPN correction.

Figure 3A:
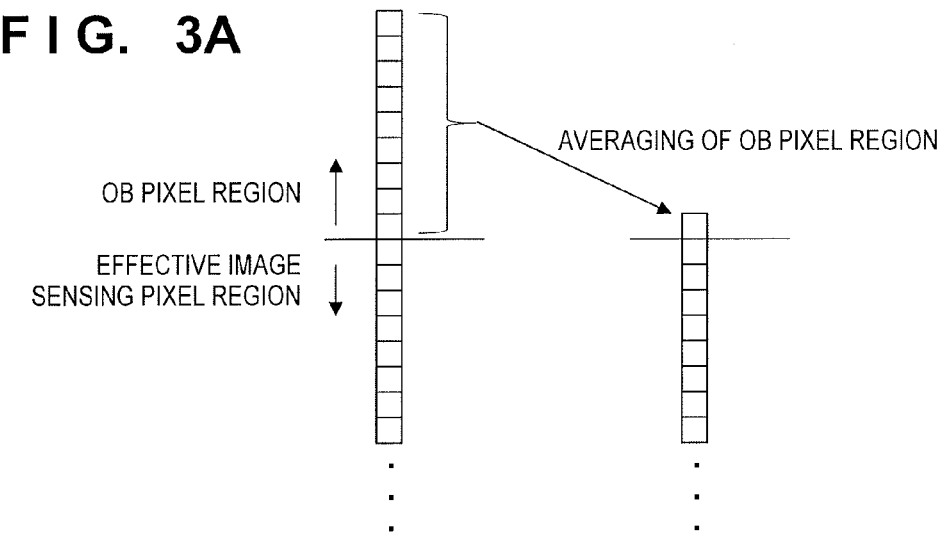
FIG. 3A is a conceptual diagram of averaging processing performed on one column in a vertical OB pixel region.

FIG. 3A is a conceptual diagram of averaging processing performed on one column in the vertical OB pixel region. The bit shift and vertical addition circuit 105 can average the OB pixel region column-by-column and compress each column into one pixel. Although not shown, similar compression can be performed on the horizontal OB pixel region as well.

Figure 2B:
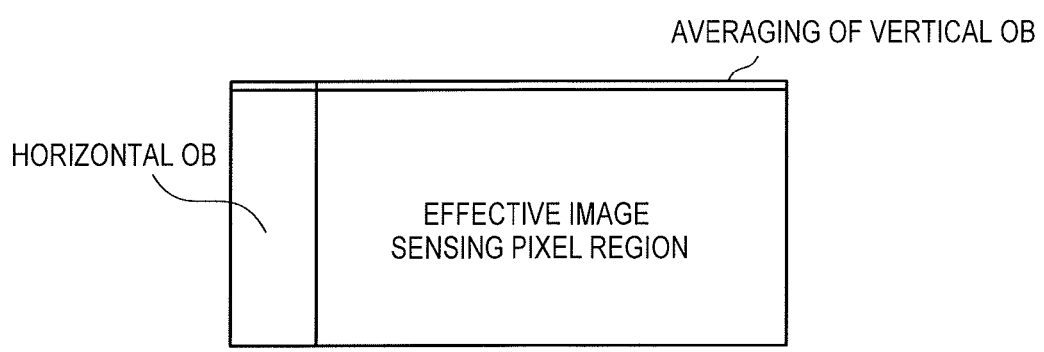
FIG. 2B is a diagram showing a video signal obtained by subjecting the video signal shown in FIG. 2A to vertical OB pixel region averaging processing shown in FIG. 3A.

FIG. 2B is a diagram showing a video signal obtained by subjecting the video signal shown in FIG. 2A to vertical OB pixel region averaging processing shown in FIG. 3A. In FIG. 2B, the vertical OB pixel region has been compressed to one row, and the data amount has been reduced compared to FIG. 2A.

Figure 2C:
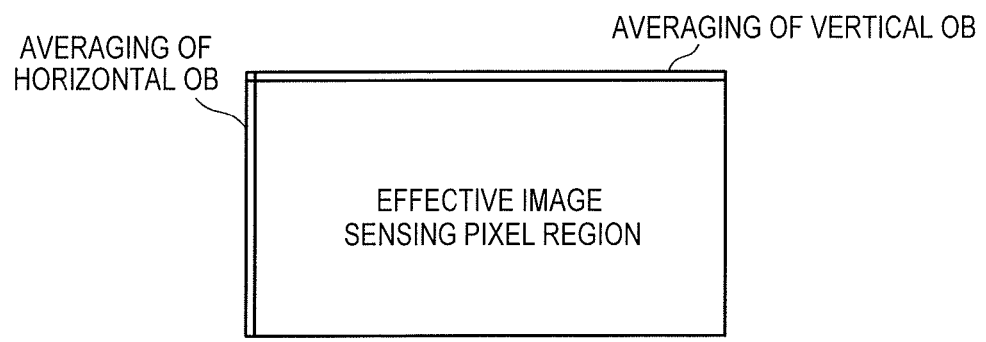
FIG. 2C is a diagram showing a video signal obtained by further subjecting the video signal shown in FIG. 2B to horizontal OB pixel region averaging processing.

Also, FIG. 2C is a diagram showing a video signal obtained by further subjecting the video signal shown in FIG. 2B to horizontal OB pixel region averaging processing. In FIG. 2C, the horizontal OB pixel region has been compressed to one column, and the data amount has been reduced compared to FIG. 2B.

Figure 3B:
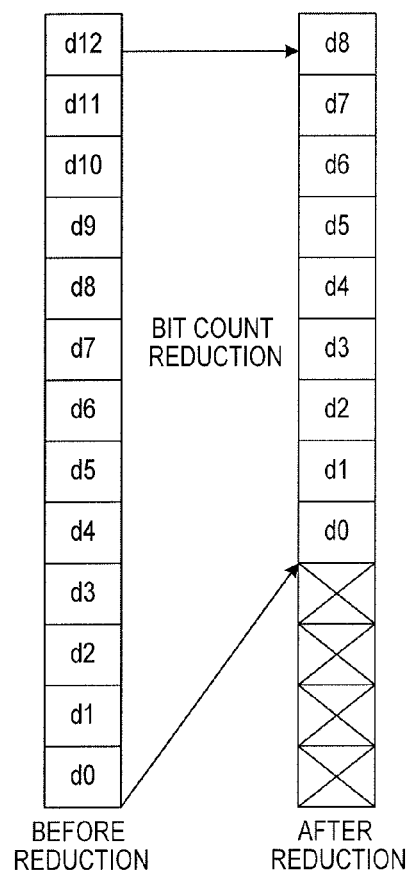
FIG. 3B is a conceptual diagram of processing for reducing the bit count of OB pixel region pixels.

FIG. 3B is a conceptual diagram of processing for reducing the bit count of OB pixel region pixels. As shown in FIG. 3B, the bit shift and vertical addition circuit 105 cuts four least significant bits from the digital data originally including 12-bit pixels by performing bit shifting. This obtains data in which each pixel has been compressed to eight bits. The data amount of the OB pixel region can be further reduced by applying this bit count reduction processing on the video signals shown in FIGS. 2A to 2C.

In the present embodiment, the image capturing apparatus 100 performs compression processing (data amount reduction) on the OB pixel region within a range in which the quality in correction processing that uses the OB pixel region does not decrease very much. Examples of correction processing that uses the OB pixel region includes OB clamping for correcting an offset component (e.g., variation in the black level) based on OB pixel region data, and FPN correction for correcting a noise component (e.g., FPN) based on OB pixel region data. Although only FPN correction will be described below in order to simplify the description, the basic ideas of OB clamping are similar to those in FPN correction.

In order to determine the extent of reduction in quality in correction processing that uses the OB pixel region, the image capturing apparatus 100 can use predetermined image capturing conditions (parameters such as the shutter speed, the gain, and the temperature of the image sensor 102) that influence the correction target component (black level variation or FPN). The image capturing apparatus 100 compares the parameters between the current frame (image data obtained in current image capturing) and the previous frame (image data obtained in previous image capturing), and determines the extent to which the OB pixel region will be compressed according to the degree of change in the parameters.

Figure 4:
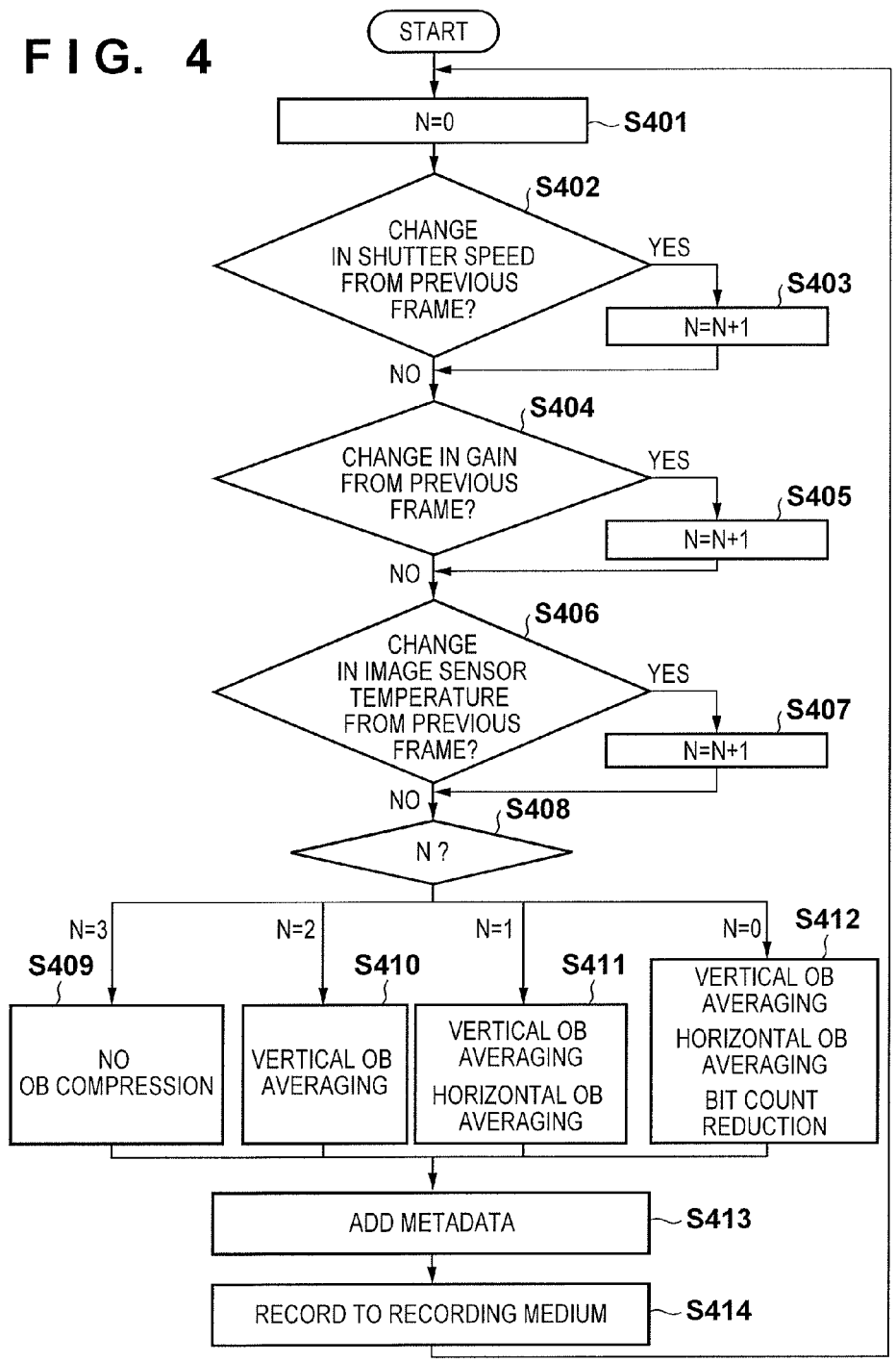
FIG. 4 is a flowchart showing a flow of OB pixel region compression processing according to the first embodiment.

FIG. 4 is a flowchart showing the flow of OB pixel region compression processing according to the first embodiment. The basic idea of compression processing is that the OB pixel region is compressed to a greater extent the lower the amount of change is in the correction target component (black level variation, FPN, or the like) relative to the previous frame. As one example in the present embodiment, the image capturing apparatus 100 determines the extent of OB pixel region compression according to how many of three parameters (namely the shutter speed, the gain, and the temperature of the image sensor 102) have changed from the time when the previous frame was captured. However, the determination criteria is not limited to this, and the image capturing apparatus 100 may use any parameters and any criteria as long as they follow the basic idea described above.

The processing of this flowchart starts when the image capturing apparatus 100 starts video capturing. In step S401, the microcontroller 113 initializes a variable N, which is for counting the number of parameters that have changed, to 0.

In step S402, the microcontroller 113 determines whether or not the shutter speed of the current frame changed from the previous frame. If it changed, the microcontroller 113 adds 1 to N in step S403. If it did not change, the procedure skips step S403 and moves to step S404.

The shutter speed is the exposure time of the image sensor 102, and the dark current and the like of the image sensor 102 and the FPN of the image sensor 102 are both different between the case where the exposure time is 1/2000 sec and the case where it is 1/2 sec, for example. For this reason, if the shutter speed changes, detailed OB pixel region data is needed in order to suppress a reduction in quality in FPN correction. According to the flowchart in FIG. 4, 1 is added to N if the shutter speed changed, and therefore the extent of the compression of the OB pixel region decreases, and it is possible to suppress a reduction in quality in FPN correction.

In step S404, the microcontroller 113 determines whether the overall gain in the image sensor 102 and the image capturing apparatus 100 in the current frame changed from the previous frame. If the gain of the amplifier or the like in the image sensor 102 changes, the FPN of the image sensor 102 changes, and therefore detailed OB pixel region data is needed in order to suppress a reduction in quality in FPN correction. In view of this, if it is determined that the gain changed, the microcontroller 113 adds 1 to N in step S405. If the gain did not change, the procedure skips step S405 and moves to step S406.

In step S406, the microcontroller 113 determines whether or not the temperature of the image sensor 102 during the capture of the current frame changed from the temperature during the capture of the previous frame. If the temperature changes, the dark current and the like of the image sensor 102 change, and the FPN of the image sensor 102 changes, and therefore detailed OB pixel region data is needed in order to suppress a reduction in quality in FPN correction. In view of this, if it is determined that the temperature changed, the microcontroller 113 adds 1 to N in step S407. If the temperature did not change, the procedure skips step S407 and moves to step S408.

Note that a threshold value may be used in order to determine whether or not the parameter changed in some or all of the steps S402, S404, and S406. For example, in step S404, the microcontroller 113 may determine that the gain changed if the change in the gain is greater than or equal to a threshold value Δy (dB: decibel), and determine that the gain did not change if the change in the gain is less than Δy (dB). The value of the threshold value Δy (dB) is a value unique to the image capturing apparatus 100, and is determined based on the magnitude of the FPN of the included image sensor 102. Alternatively, if the gain of the amplifier or the like in the image sensor 102 has changed, the microcontroller 113 may determine that the gain changed regardless of the value of Δy (dB). In another example, in step S406, the microcontroller 113 may determine that the temperature changed if the change in temperature is greater than or equal to a threshold value Δz, and determine that the temperature did not change if the change in temperature is less than Δz. The value of the threshold value Δz is a value unique to the image capturing apparatus 100, and is determined based on the magnitude of the dark current of the included image sensor 102.

In step S408, the microcontroller 113 moves to one of multiple branches of processing according to the value of the variable N. Specifically, if N=3, in step S409, the microcontroller 113 instructs the bit shift and vertical addition circuit 105 to not compress the OB pixel region data. If N=2, in step S410, the microcontroller 113 instructs the bit shift and vertical addition circuit 105 to average the vertical OB pixel region as shown in FIG. 2B. If N=1, in step S411, the microcontroller 113 instructs the bit shift and vertical addition circuit 105 to average the vertical OB pixel region and the horizontal OB pixel region as shown in FIG. 2C. If N=0, in step S412, the microcontroller 113 instructs the bit shift and vertical addition circuit 105 to average the vertical OB pixel region and the horizontal OB pixel region as shown in FIG. 2C, and then reduce the bit count as shown in FIG. 3B.

Note that the method of compressing OB pixel region data is not limited to the method shown in FIGS. 2B, 2C, and 3B. For example, the OB pixel region data may be compressed by performing averaging on the pixels in the OB pixel region in units of two pixels.

In step S413, information indicating the compression processing performed by the bit shift and vertical addition circuit 105 (information indicating how the OB pixel region data was compressed) is added to the video signal as metadata by the metadata addition unit 107. The reason for this is that the number of pixels and data amount per frame will have changed when FPN correction is performed at a later time, and therefore it will not be possible to properly perform FPN correction unless the compression state of the OB pixel region data has been recorded.

In step S414, the image capturing apparatus 100 records the current frame data to the recording medium 108 along with the metadata. The procedure then moves to step S401, and similar processing is repeated for the next frame.

As described above, according to the first embodiment, the image capturing apparatus 100 compresses the OB pixel region according to the degree to which the correction target component that is to be corrected based on the OB pixel region data (offset component or noise component) has changed relative to the previous frame. Specifically, the image capturing apparatus 100 compresses the OB pixel region if the degree of the change is less than or equal to a threshold value (in the example in FIG. 4, the case where N=2, 1, or 0), and does not compress the OB pixel region if otherwise (in the example in FIG. 4, the case where N=3). Also, in the case where the OB pixel region is compressed, the image capturing apparatus 100 compresses the OB pixel region data to a greater extent the smaller the amount of change is in the correction target component relative to the previous frame.

Accordingly, in the case where correction processing that uses OB pixel region data is performed after image data recording, it is possible to reduce the amount of OB pixel region data that is recorded while also suppressing a reduction in quality in correction processing.

Variations

In the flowchart of FIG. 4, the image capturing apparatus 100 determines the degree of change in the correction target component relative to the previous frame based on change in an image capturing condition that contributes to the generation of the correction target component (a parameter such as the shutter speed) relative to the previous frame. In contrast, in the variation described below, the degree of change in a correction target component included in full-size image data relative to the previous frame is determined based on the correction target component included in reduced image data generated by the video compression unit 109.

Specifically, in conjunction with correction processing performed on reduced image data, the image correction unit 110 detects a correction target component included in the reduced image data and notifies the microcontroller 113 of the detected correction target component. The microcontroller 113 determines the degree of change in the correction target component included in the reduced image data by comparing the notified correction target component with the correction target component included in the reduced image data of the previous frame. The change in the correction target component included in full-size image data is thought to roughly correspond to the change in the correction target component included in reduced image data. In view of this, based on the degree of change in the correction target component included in the reduced image data, the microcontroller 113 instructs the bit shift and vertical addition circuit 105 to reduce the data amount of the OB pixel region to a greater extent the lower the degree of change is.

Second Embodiment

A configuration in which OB pixel region data is deleted in order to greatly reduce the data amount of the OB pixel region will be described in a second embodiment. Also, in the configuration described below, in the case where the OB pixel region has been compressed in multiple frames obtained by performing image capture multiple times consecutively, the OB pixel region is not compressed in the frame obtained in the next instance of image capture regardless of the degree of change in the correction target component. In the present embodiment, the basic configuration of the image capturing apparatus 100 is similar to that in the first embodiment (see FIG. 1).

Figure 5:
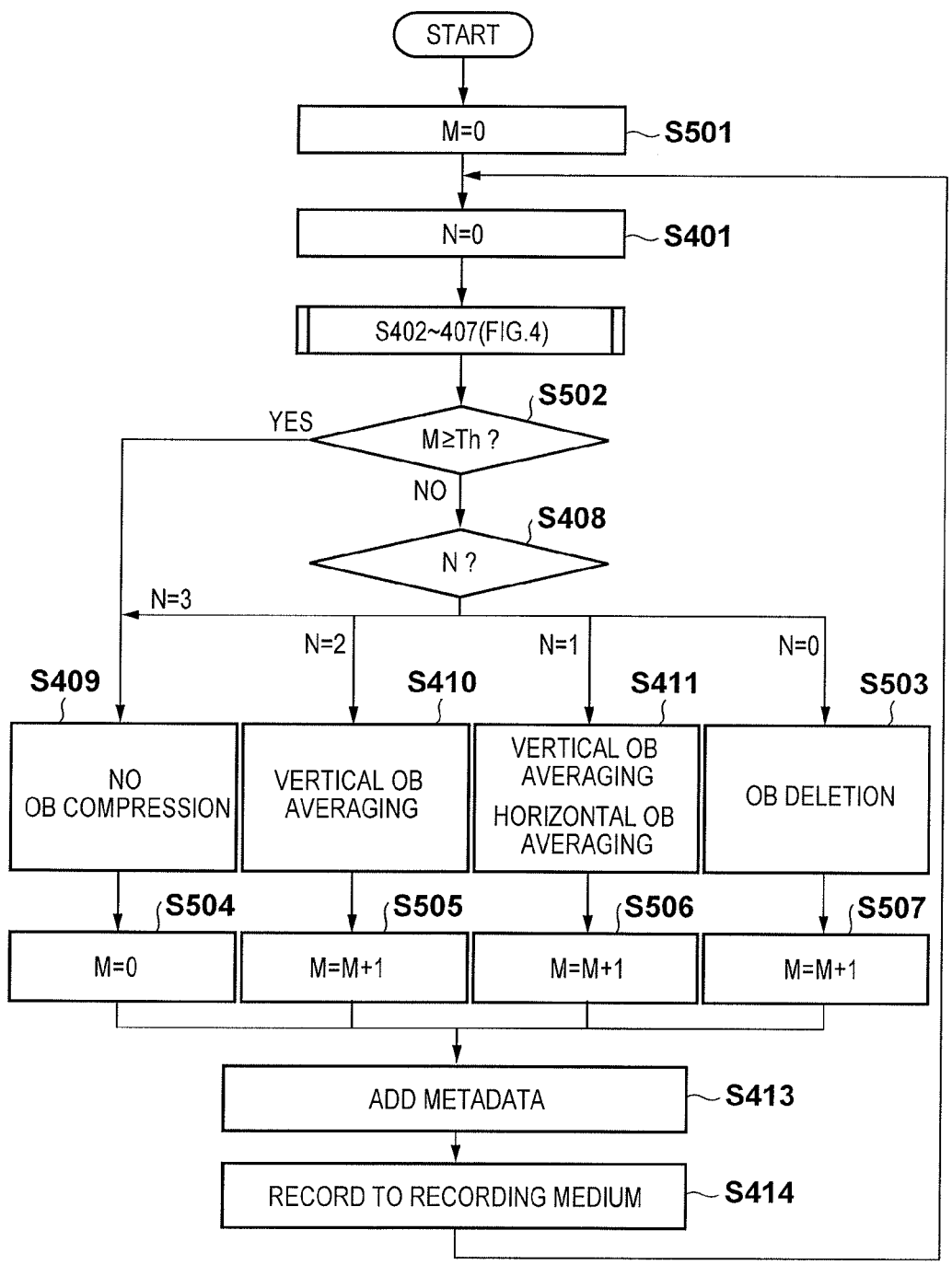
FIG. 5 is a flowchart showing a flow of OB pixel region compression processing according to a second embodiment.

FIG. 5 is a flowchart showing the flow of OB pixel region compression processing according to the second embodiment. Steps in this flowchart that are for performing processing the same as or similar to steps in FIG. 4 have been given the same reference signs, and these steps will not be described.

In step S501, the microcontroller 113 initializes a variable M, which is for counting the number of consecutive frames in which the OB pixel region has been compressed, to 0.

In step S502, the microcontroller 113 determines whether or not M is greater than or equal to a threshold value Th. If it is greater than or equal to the threshold value, the procedure moves to step S409, in which the microcontroller 113 instructs the bit shift and vertical addition circuit 105 to not compress the OB pixel region data. In this way, if OB pixel region compression has continued for a number of frames greater than or equal to the threshold value, the determination of step S408 is not made, and the OB pixel region data is not compressed regardless of whether or not an image capturing condition has changed. Note that if the image sensor 102 is driven at 60 fps, the threshold value Th is set to 60, for example. In this case, a frame having the entirety of the OB pixel region recorded is always created one time every second.

If N=0 in step S408, the procedure moves to step S503, in which the microcontroller 113 instructs the bit shift and vertical addition circuit 105 to delete the OB pixel region. In this way, in the present embodiment, if the change in an image capturing condition is very small (i.e., if the change in a correction target component is very small), the OB pixel region is deleted instead of being compressed.

In the case where the OB pixel region data is not to be compressed, the procedure moves to step S504, in which the microcontroller 113 initializes the variable M to 0. On the other hand, in the case where the OB pixel region data is to be compressed or deleted, the procedure moves to step S505, S506, or S507, in which the microcontroller 113 adds 1 to the variable M.

As described above, according to the second embodiment, if N=0 in step S408 (i.e., if the change in an image capturing condition is very small), the image capturing apparatus 100 deletes the OB pixel region data before recording the image data. Also, if the OB pixel region has been compressed in multiple frames obtained by performing image capture multiple times consecutively, the image capturing apparatus 100 does not compress the OB pixel region in the frame obtained in the next instance of image capture regardless of the degree of change in the correction target component. This makes it possible to greatly reduce the data amount of the OB pixel region, and to suppress a reduction in quality in correction processing.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-193490, filed on Sep. 18, 2013, which is hereby incorporated by reference herein in its entirety.

What is claimed is:

1. An image capturing apparatus comprising:
   an imager which includes an image sensor which has an effective pixel region and a reference pixel region which outputs a reference signal for correcting an output signal of the effective pixel region;
   a compressor which compresses reference pixel region data that corresponds to the reference pixel region in an image data obtained by the imager;
   a recorder which records the image data after the processing performed by the compressor; and
   a controller which controls a compression operation by the compressor based on change in an image capturing condition of the imager,
   wherein the image capturing condition contributes to generation of a correction target component,
   wherein the compressor compresses the reference pixel region data regardless of compression of effective pixel region data that corresponds to the effective pixel region in the image data obtained by the imager, and
   wherein the controller controls the compressor to compress the reference pixel region data in a case where a degree of change in the correction target component included in the effective pixel region data that corresponds to the effective pixel region in an image data obtained by current image capturing performed by the imager relative to previous image capturing performed by the imager is less than or equal to a threshold value.

2. The image capturing apparatus according to claim 1, wherein the correction target component includes at least one of an offset component and a noise component that is corrected based on the reference pixel region data.

3. The image capturing apparatus according to claim 2, wherein the offset component is variation in a black level of the image sensor, and the noise component is fixed pattern noise (FPN) of the image sensor.

4. The image capturing apparatus according to claim 1, further comprising:
   a generator which generates a reduced image data by reducing a number of pixels in the image data; and
   a detector which detects a component that corresponds to the correction target component in the reduced image data,
   wherein the compressor determines the degree of change in the correction target component based on change in the component detected by the detector relative to the previous image capturing.

5. The image capturing apparatus according to claim 1, wherein the compressor compresses the reference pixel region data to a greater extent as the degree of change in the correction target component becomes smaller.

6. The image capturing apparatus according to claim 1, wherein the recorder records information indicating how the reference pixel region data was compressed by the compressor together with the image data.

7. The image capturing apparatus according to claim 1, wherein in a case where the compressor has performed the compression on a plurality of image data obtained by performing image capturing a plurality of times consecutively, the compressor does not perform the compression on an image data obtained in next image capturing regardless of the degree of change in the correction target component.

8. An image capturing apparatus comprising:
an imager which includes an image sensor which has an effective pixel region and a reference pixel region which outputs a reference signal for correcting an output signal of the effective pixel region;
a compressor which compresses reference pixel region data that corresponds to the reference pixel region in an image data obtained by the imager;
a recorder which records the image data after the processing performed by the compressor; and
a controller which controls a compression operation by the compressor based on change in an image capturing condition of the imager,
wherein the compressor compresses the reference pixel region data regardless of compression of effective pixel region data that corresponds to the effective pixel region in the image data obtained by the imager,
wherein the compressor compresses the reference pixel region data by subjecting the reference pixel region data to processing for reducing at least one of a number of pixels and a bit count per pixel, and
wherein the reference pixel region includes an optical black (OB) pixel region, and the compressor reduces the number of pixels in the OB pixel region data by performing at least one of processing for averaging pixels that correspond to a vertical OB pixel region in the OB pixel region data column-by-column, and processing for averaging pixels that correspond to a horizontal OB pixel region in the OB pixel region data row-by-row.

9. The image capturing apparatus according to claim 8, wherein the recorder records information indicating how the reference pixel region data was compressed by the compressor together with the image data.

10. A control method for an image capturing apparatus that comprises an imager which includes an image sensor which has an effective pixel region and a reference pixel region which outputs a reference signal for correcting an output signal of the effective pixel region, the control method comprising:
compressing reference pixel region data that corresponds to the reference pixel region in an image data obtained by the imager;
recording the image data after the processing performed in the compressing; and
controlling a compression operation in the compressing based on change in an image capturing condition of the imager,
wherein the image capturing condition contributes to generation of a correction target component,
wherein the reference pixel region data is compressed regardless of compression of effective pixel region data that corresponds to the effective pixel region in the image data obtained by the imager in the compressing, and
wherein the reference pixel region data is compressed in the compressing in a case where a degree of change in the correction target component included in the effective pixel region data that corresponds to the effective pixel region in an image data obtained by current image capturing performed by the imager relative to previous image capturing performed by the imager is less than or equal to a threshold value.

11. A non-transitory computer-readable storage medium which stores a program for causing a computer to execute a control method for an image capturing apparatus that comprises an imager which includes an image sensor which has an effective pixel region and a reference pixel region which outputs a reference signal for correcting an output signal of the effective pixel region, the control method comprising:
compressing reference pixel region data that corresponds to the reference pixel region in an image data obtained by the imager;
recording the image data after the processing performed in the compressing; and
controlling a compression operation in the compressing based on change in an image capturing condition of the imager;
wherein the image capturing condition contributes to generation of a correction target component,
wherein the reference pixel region data is compressed regardless of compression of effective pixel region data that corresponds to the effective pixel region in the image data obtained by the imager in the compressing, and
wherein the reference pixel region data is compressed in the compressing in a case where a degree of change in the correction target component included in the effective pixel region data that corresponds to the effective pixel region in an image data obtained by current image capturing performed by the imager relative to previous image capturing performed by the imager is less than or equal to a threshold value.

12. A control method for an image capturing apparatus that comprises an imager which includes an image sensor which has an effective pixel region and a reference pixel region which outputs a reference signal for correcting an output signal of the effective pixel region, the control method comprising:
compressing reference pixel region data that corresponds to the reference pixel region in an image data obtained by the imager;
recording the image data after the processing performed in the compressing; and
controlling a compression operation in the compressing based on change in an image capturing condition of the imager,
wherein the reference pixel region data is compressed regardless of compression of effective pixel region data that corresponds to the effective pixel region in the image data obtained by the imager in the compressing,
wherein the reference pixel region data is compressed in the compressing by subjecting the reference pixel region data to processing for reducing at least one of a number of pixels and a bit count per pixel, and
wherein the reference pixel region includes an optical black (OB) pixel region, and the number of pixels in the OB pixel region data is reduced in the compressing by performing at least one of processing for averaging pixels that correspond to a vertical OB pixel region in the OB pixel region data column-by-column, and processing for averaging pixels that correspond to a horizontal OB pixel region in the OB pixel region data row-by-row.

13. A non-transitory computer-readable storage medium which stores a program for causing a computer to execute a control method for an image capturing apparatus that comprises an imager which includes an image sensor which has an effective pixel region and a reference pixel region which outputs a reference signal for correcting an output signal of the effective pixel region, the control method comprising:
compressing reference pixel region data that corresponds to the reference pixel region in an image data obtained by the imager;

recording the image data after the processing performed in the compressing; and controlling a compression operation in the compressing based on change in an image capturing condition of the imager, wherein the reference pixel region data is compressed regardless of compression of effective pixel region data that corresponds to the effective pixel region in the image data obtained by the imager in the compressing, wherein the reference pixel region data is compressed in the compressing by subjecting the reference pixel region data to processing for reducing at least one of a number of pixels and a bit count per pixel, and wherein the reference pixel region includes an optical black (OB) pixel region, and the number of pixels in the OB pixel region data is reduced in the compressing by performing at least one of processing for averaging pixels that correspond to a vertical OB pixel region in the OB pixel region data column-by-column, and processing for averaging pixels that correspond to a horizontal OB pixel region in the OB pixel region data row-by-row.

* * * * *